May 23, 1933. G. W. FITZ GERALD 1,910,888
TRAY AND METHOD OF MAKING THE SAME
Filed May 22, 1931
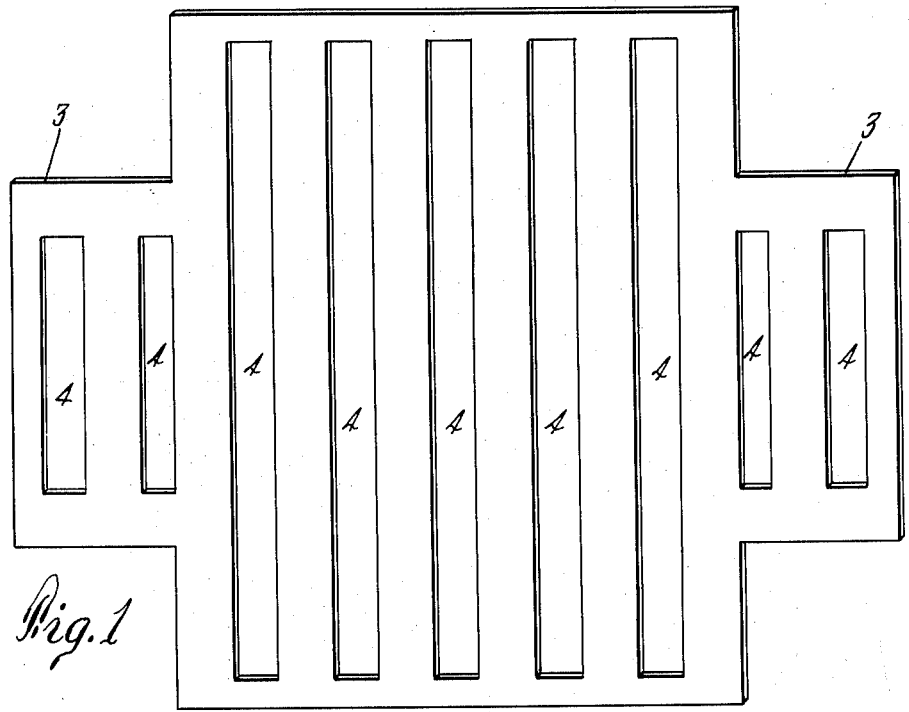
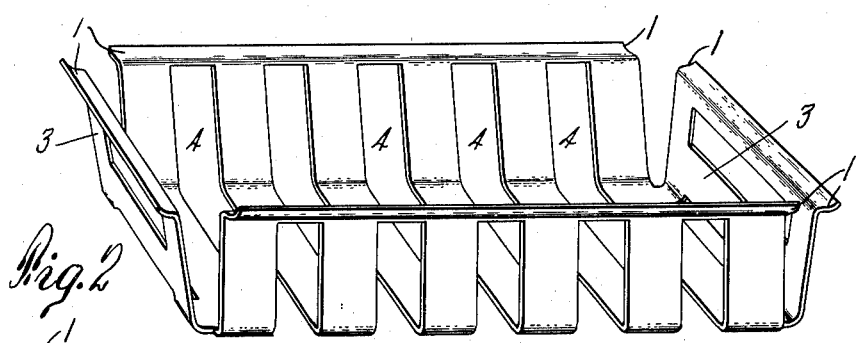
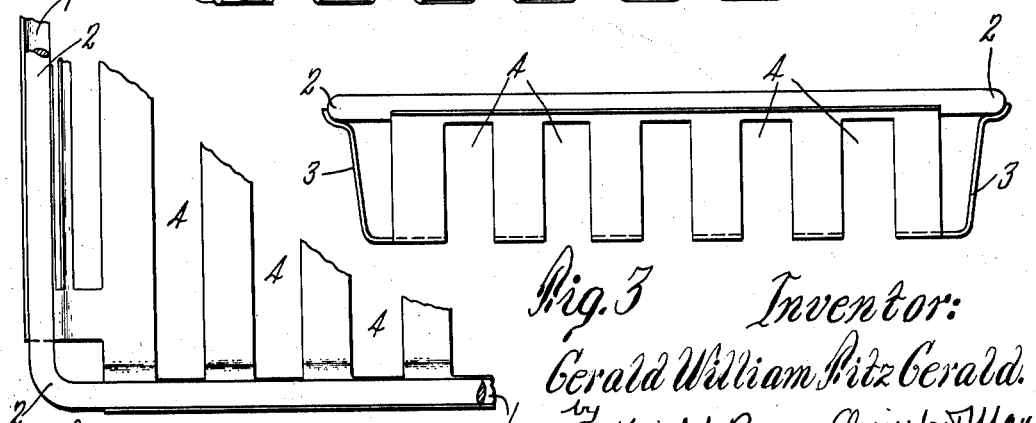
Inventor:
Gerald William Fitz Gerald.

Patented May 23, 1933

1,910,888

UNITED STATES PATENT OFFICE

GERALD WILLIAM FITZ GERALD, OF SWAMPSCOTT, MASSACHUSETTS, ASSIGNOR TO BEACON ENAMELED PRODUCTS, INC., OF ATHOL, MASSACHUSETTS, A CORPORATION

TRAY AND METHOD OF MAKING THE SAME

Application filed May 22, 1931. Serial No. 539,216.

This invention relates to improvements in trays or open containers and has for an object to provide a method of manufacture and an article which is economical in its making and is strong and durable in use. The article herein described particularly, is a soap dish, although other containers may be made by the method and with the characteristics of the particular article described.

Fig. 1 is a perspective of the blank after the stamping out operations.

Fig. 2 is a perspective of the blank after the molding and bending operation.

Fig. 3 is a perspective showing the side elevation of the dish.

Fig. 4 is a fragmentary plan view showing a corner of the soap dish in its completed form.

Heretofore it has been the practice of the manufacturers of articles of this type, which require openings for ventilation or draining of the article to be contained, to construct the same by bending wires, bars or strips of metal and attaching said wires, bars or strips at the ends thereof where they contact with the frame thereto. I have found that a better result may be more economically and advantageously obtained by stamping a sheet of metal in a form which is substantially rectangular, having at the sides extending tabs 3 as shown in Fig. 1 and stamped-out or cut-out portions 4 forming a reticulated grille-like structure in the sheet. The interior stamped-out portions may, of course, be varied to suit the desire and design of the manufacturer, although they are herein shown as substantially rectangular strips, leaving a continuous margin at the outer edges of the blank for the purpose of providing a strip of material for subsequent welding to an open frame. The blank is then molded by stamping and bending into a form as shown in Fig. 2, the portions 1 being molded to conform to the dimensions of the wire frame 2, the lines of bending being at the sides of the bottom of the tray. The forming of the blank, its stamping out and bending operations may be simultaneously performed, if desired, without departing from the scope of the invention. The frame 2 may be and is preferably composed of heavy wire which is easily shaped into the desired form. The welding operation is then performed. The edges 1 are preferably attached by spot welding to the wire frames 2, the molding having preformed these edges to a curvature closely approximating the circumferential dimension of the wire. Obviously the spot welding may be performed on the molded edges much more economically than if the bars or strips of metal were separately welded to each end, and the possibility of insufficient welding and weakness in an attachment of a particular strip is obviated. The result obtained is stronger, smoother, closer fitting and of better appearance. By this method, the entire edge strip of the blank may be welded to the frame as a unit, though the weld is preferably made in small separated spots at the sides and ends. Even if spot welded at separated spots, there is a considerable margin of safety over the prior methods, since insufficient welding in one or more spots will not cause a vital point of weakness of attachment, one strongly welded spot at each edge being sufficient to hold the edge securely.

By the practice hitherto obtaining in the art there were left by the strips or bars at the point of contact with the frame spaces which gave an impression of fragility, whereas, by the method described, a continuous strip is provided which fills up the sides of the article and which is both in appearance and strength of more substantial and solid construction. It is my practice to enamel these articles in appropriate colors by dipping in a bath of thick enamel which fills in the spaces and crevices, rounds the sharp corners of the metal and in final result gives an appearance of a completely molded article.

I claim:

1. An open container formed from a stamped sheet metal blank having apertures formed therein, having the sides bent upwardly from the bottom, the upper edges being bent outwardly, and molded in channeled form with concave face upward, and a wire frame fitted in the channel in said edges, and being secured thereto by spot welding at spaced points.

2. The process of manufacturing an open container which consists of stamping out a sheet metal blank with apertures therein, having extending tabs to form the sides and ends of said container, the outer edges of each of said tabs being a continuous metal strip, molding said sheet and end tabs upwardly from the bottom portion of the container and shaping each of the continuous strip edges of said tabs with a groove with concave face upward, fitting a wire frame into said grooves, and securing said wire frame in said grooves by spot welding at spaced points.

3. A container formed from a sheet metal blank having apertures therein and having a continuous metal lip extending outwardly along the upper edges of each of the side and end portions of said container, and a wire frame secured to the upper face of said lips by spot welding at spaced points on each of the side and end portions.

4. An open container comprising a stamped metal member having side and end walls, each said wall having an outwardly projecting unitary rim channeled from end to end so that the channels open upwardly, and a wire loop fitted into all said channels and welded therein.

5. The process of manufacturing an open reticulated receptacle which consists of stamping out a sheet metal blank having extending tabs at the sides and ends thereof, the central and tab portions being formed with apertures therein formed simultaneously with the stamping operation, molding said blank to form a central flat bottom portion with upwardly extending side and end portions so that the side and end portions are each provided with an outwardly projecting lip with a groove in its upper surface, fitting a wire frame into said grooves, and fastening said wire frame in said grooves by spot-welding.

6. An open receptacle comprising a stamped out unitary metal member having side and end walls provided with open slots extending from side to side thereof and terminating adjacent the side edges of the end portions and adjacent the wide wall upper portions, said receptacle having a continuous lip portion extending along the upper edges of each of the side and end portions and grooved in its upper surface, and a wire frame secured in the grooves of said lip portions by spot-welding at spaced points.

In testimony whereof I have affixed my signature.

GERALD WILLIAM FITZ GERALD.